Figure 1:
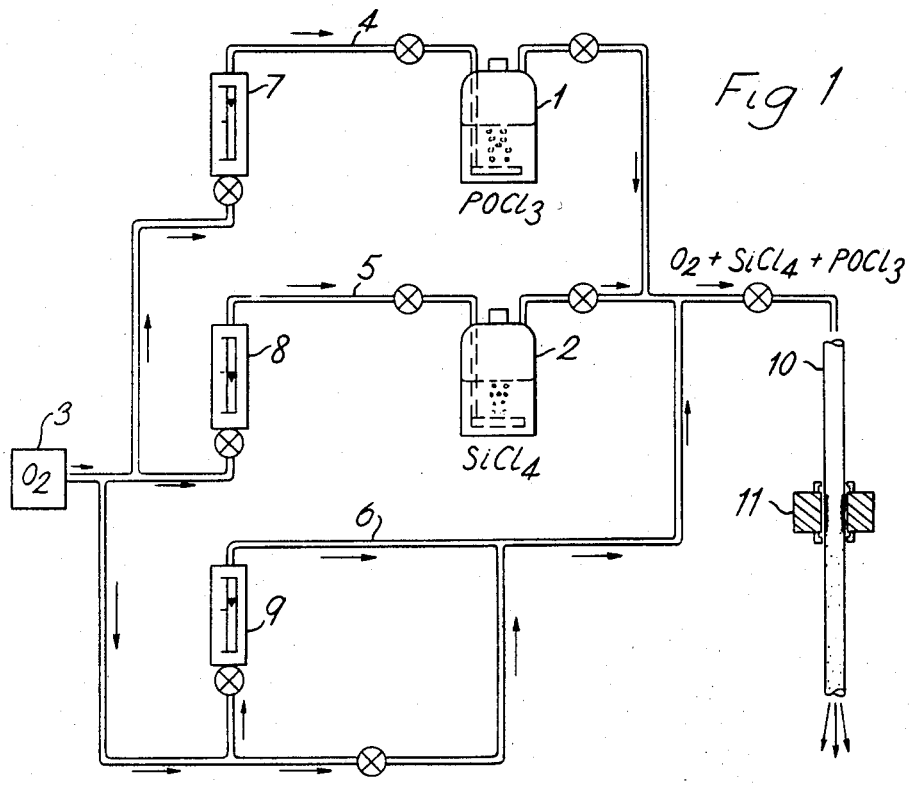

United States Patent [19]
Payne et al.

[11] 4,360,250
[45] Nov. 23, 1982

[54] OPTICAL WAVEGUIDES

[75] Inventors: David N. Payne, Southampton; William A. Gambling, Chandlers Ford, both of England

[73] Assignee: National Research Development Corp., London, England

[21] Appl. No.: 581,472

[22] Filed: May 28, 1975

[30] Foreign Application Priority Data

May 31, 1974 [GB] United Kingdom ............... 24177/74
Aug. 7, 1974 [GB] United Kingdom ............... 34813/74
Dec. 30, 1974 [GB] United Kingdom ............... 55999/74

[51] Int. Cl.³ ............................................. G02B 5/172
[52] U.S. Cl. ............................... 350/96.30; 350/96.31; 350/96.34
[58] Field of Search ........ 350/96 WG, 96 M, 96 GN, 350/96.29, 96.30, 96.31, 96.34; 106/47 Q, 50, 52

[56] References Cited

U.S. PATENT DOCUMENTS 3,856,494 12/1974 Kitano et al. ............. 350/96 GN X
3,884,550 5/1975 Maurer et al. ................ 350/96 WG
4,339,173 7/1982 Aggarwal et al. ................ 350/96.30

*Primary Examiner*—John D. Lee
*Attorney, Agent, or Firm*—Cushman, Darby & Cushman

[57] ABSTRACT

An optical waveguide has a silica cladding and a phosphosilicate core. Additional components may be added to improve the match of physical properties between core and cladding. The waveguide is manufactured by passing a mixture of vapors of silicon tetrachloride and phosphorus oxychloride through the interior surface of a glass tube and heating to cause oxidation and simultaneous deposition of silica and phosphorus pentoxide. The interior coated tube is then collapsed to a rod and the rod is drawn into an optical fibre.

27 Claims, 2 Drawing Figures

U.S. Patent

Nov. 23, 1982

4,360,250

OPTICAL WAVEGUIDES

This invention relates to optical waveguides.

Optical waveguides operate to transmit electromagnetic energy of wavelengths in or near the visible spectrum (i.e. in the form of light) and comprise an inner core of transparent material surrounded by a cladding having a lower refractive index than the core and which acts to prevent light escaping from the core. It is important that attenuation in the core is minimised and to this end various different materials have been proposed for the core and the cladding.

According to the invention an optical waveguide comprises a core of glass formed of phosphorus pentoxide and at least one other component and a cladding of a glass of lower refractive index than the core wherein the decrease in refractive index of the cladding relative to the core is obtained at least in part by having a lower or zero concentration of phosphorus pentoxide in the cladding than in the core.

Preferably the core is a phosphosilicate glass formed of phosphorus pentoxide and silica.

The cladding may comprise pure silica a high silica content glass or silica containing a proportion of phosphorus pentoxide which is lower than the concentration of the phosphorus pentoxide in the core.

Instead of using pure silica for the cladding, or a phosphosilicate glass having a lower concentration of phosphorus pentoxide than the core, a borosilicate glass can be used as the cladding.

A graded change of refractive index from the core to the cladding may be provided and such graded change is produced by providing a corresponding graded change in concentration of phosphorus pentoxide.

In addition to phosphorus pentoxide which is included in the core an additional component may be added, for example germania, or a trivalent oxide which may be selected from the oxides of boron, aluminium and antimony.

In accordance with a further aspect of the invention a method of manufacturing an optical waveguide includes the steps of passing a mixture of vapours of suitable compounds of phosphorus and silicon through a tube, heating the tube to oxidise the said compounds to phosphorous pentoxide and silica and fusing the phosphorus pentoxide and silica on the interior surface of the tube.

In order to reduce the deleterious effect of impurities in the glass it is desirable for the starting compounds to be in liquid form so that they can be readily purified for example by distillation. Suitable compounds comprise silicon tetrachloride and phosphorus trichloride or phosphorus oxychloride. Oxygen is bubbled through the two liquids and the oxygen streams carrying silica tetrachloride vapour and phosphorus oxychloride vapour are then mixed and more oxygen may be added in such a ratio as to give the desired relative concentrations of phosphorus pentoxide and silica in the glass. The mixed vapour is then oxidised at an appropriate elevated temperature and simultaneously deposited as a fused layer of phosphosilicate glass on the interior surface of a silica tube.

The coated tube is then collapsed to form a rod and the rod is then drawn down to a fibre.

Figure 2:
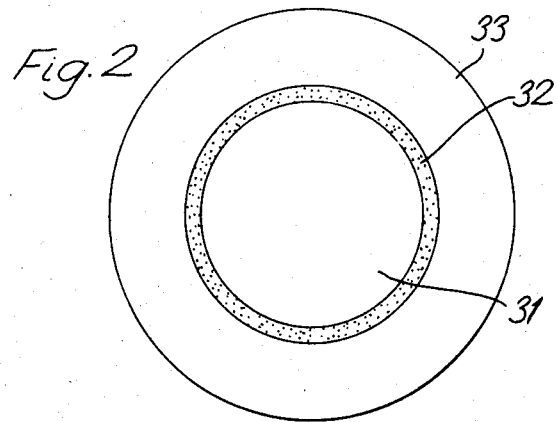

In order that the invention may be more fully understood reference will now be made to the accompanying drawings in which:

FIG. 1 illustrates apparatus used for manufacturing an optical waveguide embodying the invention, and FIG. 2 illustrates an optical waveguide that is produced.

Referring now to FIG. 1 there is shown therein apparatus for the chemical vapour deposition of appropriate materials in a silica tube. The starting materials for the deposition process are volatile compounds of the required constituents. Conveniently phosphorus oxychloride and silicon tetrachloride are used and these are contained in the vessels 1 and 2. If the cladding incorporates a borosilicate glass then a similar additional vessel containing boron trichloride is also provided. The phosphorus oxychloride in vessel 1 can be distilled in order to improve its purity. Oxygen from a supply 3 is passed through respective lines 4, 5 and 6 at a rate which is controlled by flow meters 7, 8 and 9 in these lines. The oxygen in passing through vessels 1 and 2 carries with it vapours of phosphorus oxychoride and silicon tetrachloride respectively and the two vapour streams are combined and if required are diluted with further oxygen from line 6 to pass through a glass deposition tube 10. A short furnace 11 is moved relatively to tube 10 and oxidation of the chlorides to produce the relevant oxides takes place. Alternatively furnace 11 may be fixed and silican tube 10 traversed through the furnace.

The oxidation reaction of the chlorides of silicon and phosphorus occurs spontaneously in the gas phase at the relatively low temperature of approximately 1300° C. to form a dense fog of small glass particles. In addition, provided the viscosity of the glass is substantially lowered by the incorporation of sufficient phosphorus pentoxide (or other suitable component) then the glass particles fuse on the walls of the container to form a clear, uniform, homogeneous layer of phosphosilicate glass. Thus a high deposition rate can be obtained since no gas dilutants are required to slow the reaction and the glass deposition may occur directly on the walls of the silica tube which, because of the comparatively low temperature, suffers no deformation.

Typical operating conditions are as follows. For a silica tube with a bore of 10 mm the flow rates of oxygen and silicon tetrachloride vapour are kept constant at 600 and 35 ml/min. respectively, while that of phosphorus oxychloride vapour is varied over the range 1 to 13 ml/min. With a furnace temperature between 1250° C. and 1550° C. the phosphosilicate glass layer is deposited on the inner wall as the tube is passed through.

Tube 10 is traversed a number of times through furnace 11 and on each traverse a layer of glass is deposited on the inner surface of tube 10. The proportions of the constituents are varied after appropriate number of layers are deposited in order to produce the required glass for the cladding and the core as may be required. For a graded index optical waveguide there will be a gradual change in proportion of constituents between appropriate layers.

The deposition time of each layer is about 8 minutes for a typical length of tube 10 of 50 cm and the phosphorus pentoxide concentration is between 4% and 40% by weight depending on the flow rate of the phosphorus oxychloride. With these flow rates and temperature the amount of downstream soot formation which passes out of the far end of tube 10 is small. The refractive index of successive layers each about 12 microns thick can be accurately controlled and a wide range of profiles from a uniform to a graded index can be produced.

To form a cladding of a borosilicate glass apparatus similar to that shown in FIG. 1 is used but with an additional input for boron trichloride gas. The flow rates of boron trichloride and silicon tetrachloride are typically 8 and 35 ml/min respectively together with 450 ml/min of oxygen. The first three layers are of constant composition while the next three are formed by reducing the flow rate of boron trichloride to zero in stages. The amount of phosphorus oxychloride is then increased gradually from zero to 9 ml per minute over the next 14 layers thus giving a total of 20 layers. While in the initial tube so formed the successive depositions of phosphosilicate glass are clearly differentiated a certain amount of diffusion takes place during the subsequent tube-collapsing and fibre-drawing stages to smooth out the concentration gradient. A fibre having a graded index core in a borosilicate cladding is thereby produced.

Collapse of the layered supporting tube 10 into a rod preform is effected by rotating tube 10 and heating it carefully in an oxy-hydrogen flame which is traversed along the length of the tube and which heats the tube to a sufficiently high temperature to cause its collapse.

When collapsing the tube it is important to maintain its circularity since any departure therefrom will affect the circularity of the final drawn fibre and hence adversely affect its optical transmission properties. To maintain the circularity of the collapsing tube a small excess pressure is maintained within the tube as it is collapsed. The magnitude of this pressure is a function of the diameter of the central hole. In addition to maintain circularity after the central bore is closed a cooling zone is passed along the collapsed tube immediately behind the heating zone.

The tube can conveniently be pressurised by venting a gas flow to air through a restricted orifice. The gas flow can comprise the original reactants, namely oxygen carrying silicon tetrachloride and phosphorus oxychloride vapours. A flow high in phosphorus oxychloride prevents loss of the more volatile phosphorus pextoxide. One end of the tube is connected to the input side of the orifice and the other end is sealed. This method has the advantage that the internal pressure will not change significantly when the gas in the tube is heated and expands. The heating zone is traversed along the tube at an appropriate rate from the sealed end. The cooling zone comprises an array of nozzles positioned immediately behind the gas burner and fed with air under pressure to direct an air blast on to the heated collapsed tube. Control of the air blast gives some control over the collapse of the tube and the blast can be conveniently adjusted to make the point of collapse occur very close to the chill air blast region. By this means the effect of internal pressurisation can be obtained until the last possible moment, when the central hole disappears and the glass is immediately chilled while it still has a perfect circular form. The heating and cooling zones may be traversed along the tube several times to collapse it in stages.

An alternative method of collapsing the tube is to pass it through a heated die. The size of the die may be such that the bore of the tube is completely closed to form a rod, or may be chosen to leave a small hole in the centre of the tube. The hole is eliminated during the fibre pulling operation. Another method of collapsing the tube is to pass a hot zone along the tube and rotate it while applying a graphite tool against its side and moving the tool slowly along the tube behind the hot zone.

After a rod has been formed from the collapsed tube it is then drawn down into a fibre in a fibre drawing machine. A 50 cm rod obtained from a tube 10 of corresponding length can be drawn out to form a 1.2 km length of fibre.

The addition of phosphorus pentoxide to silica has a marked effect on certain physical properties of the resulting phosphosilicate glass which limits the proportion of phosphorus pentoxide that can be included, although as a high a proportion as possible is desirable to obtain the requisite optical properties. One physical property that is affected is the expansion coefficient. The expansion coefficient of pure silica is much lower than that for phosphorus pentoxide so that as the proportion of phosphorus pentoxide in a phosphosilicate glass is increased there is a corresponding increase in the expansion coefficient and an increasing mismatch between the silica cladding and the phosphosilicate core. In conjunction with the somewhat lower strength of phosphosilicate glass this can result in spontaneous shattering of the core if the proportion of phosphorus pentoxide is too high. Other physical properties that are affected are the viscosity and the volatility which create problems of manufacture of an optical waveguide.

To improve the physical matching of the core and cladding an additional component comprising germania, or a trivalent oxide selected from one or more of the oxides of boron, aluminium, antimony, arsenic and bismuth can be incorporated.

The additional component may be incorporated into the glass core by adding the vapour of a volatile compound of the selected element to a gaseous stream carrying the vapour of appropriate volatile compounds of silicon and of phosphorus and depositing the vapour on the inner surface of a silica tube as described in above.

Alternatively a layer of a two-component phosphosilicate glass can be formed on the inner surface of a hollow tube as described above and the third component diffused at elevated temperature into the layer from within the tube. The diffusion source may be either a vapour, a liquid or a solid and the diffusion step can be completed either before collapsing the tube or after partial collapse so as to leave a small hole in the centre. A separate diffusion stage may be necessary in cases where the tube is subjected to a high temperature, or alternatively the diffusion may take place after collapsing the tube and when drawing it into fibre form when the high temperature and resulting low viscosity may be sufficient to allow simultaneous drawing and diffusion.

An example of a typical fibre manufactured by the method described above is shown in FIG. 2 in cross-section. The fibre has a central core 31 formed of phosphosilicate glass and if there has been a progressive change in the rate of oxygen bubbled through the phosphorus oxychloride vessel 1 then the core 31 will have a graded refractive index. Surrounding core 31 is a cladding 32 of borosilicate glass. The outermost annular ring 33 is formed from the original silica support tube 10 and plays no part in the optical properties of the fibre but acts as a mechanical support and protection. Measurements of the attenuation of optical fibres of the kind shown in FIG. 3 show that over a wavelength from 0.75 to 1.25 microns the loss is as low as 3 dB/km and is constant over that range. The hydroxyl impurity content in the fibre is extremely low due it is believed to the strong hygroscopic nature of phosphorus pentoxide.

Thus any residual water in the depositing equipment is converted on contact to non-volatile phosphoric acid and is not carried into the deposition zone.

We claim:

1. An optical waveguide comprising a core of a glass formed of phosphorus pentoxide and silica and a cladding of a glass of lower refractive index than the core wherein the decrease in refractive index of the cladding relative to the core is obtained at least in part by having a lower concentration of phosphorus pentoxide in the cladding than in the core.

2. The optical waveguide as claimed in claim 1 in which the cladding has a zero concentration of phosphorus pentoxide.

3. The optical waveguide as claimed in claim 1 in which the cladding comprises silica.

4. The optical waveguide as claimed in claim 3, in which said core of glass consists essentially of phosphorus pentoxide and silica.

5. The optical waveguide as claimed in claim 1 in which the cladding comprises a high silica content glass.

6. The optical waveguide as claimed in claim 1 in which the cladding comprises a borosilicate glass.

7. The optical waveguide as claimed in claim 6, in which said core of glass consists essentially of phosphorus pentoxide and silica.

8. The optical waveguide as claimed in claim 1 in which the core includes an oxide of a trivalent element.

9. The optical waveguide as claimed in claim 8 including in the core an oxide of boron.

10. The optical waveguide as claimed in claim 8 in which the trivalent element is selected from at least one of the elements boron and aluminium.

11. The optical waveguide as claimed in claim 10 including in the core an oxide of aluminum.

12. The optical waveguide as claimed in claim 1 including in the core a trivalent oxide of antimony, arsenic or bismuth.

13. The optical waveguide as claimed in claim 12 including in the core antimony trioxide.

14. A rod preform for an optical waveguide comprising a core of a glass formed of phosphorus pentoxide and silica and a cladding of a glass of lower refractive index than the core wherein the decrease in refractive index of the cladding relative to the core is obtained at least in part by having a lower concentration of phosphorus pentoxide in the cladding than in the core.

15. The rod preform as claimed in claim 14 in which the cladding comprises silica.

16. The rod preform as claimed in claim 14 in which the cladding comprises a high silica content glass.

17. A rod preform as claimed in claim 14 in which the core includes an oxide of a trivalent element.

18. The rod preform as claimed in claim 17 in which the trivalent element is selected from at least one of the elements boron and aluminum.

19. A rod preform as claimed in claim 18 including in the core an oxide of boron.

20. A rod preform as claimed in claim 18 including in the core an oxide of aluminum.

21. The rod preform as claimed in claim 14 in which the cladding has a zero concentration of phosphorus pentoxide.

22. The rod preform as claimed in claim 14 in which the cladding comprises a borosilicate glass.

23. A rod preform as claimed in claim 14 including in the core a trivalent oxide of antimony, arsenic or bismuth.

24. A rod preform as claimed in claim 23 including in the core antimony trioxide.

25. A rod preform for an optical waveguide comprising a glass formed of phosphorus pentoxide and silica wherein there is a graded change of refractive index in a radial direction, said graded change of refractive index being caused by a corresponding graded change in concentration of phosphorus pentoxide.

26. An optical waveguide comprising a glass formed of phosphorus pentoxide and silica wherein there is a graded change of refractive index in a radial direction said graded change of refractive index being caused by a corresponding graded change in concentration of phosphorus pentoxide.

27. An optical waveguide comprising a core of glass formed of phosphorus pentoxide and silica and a cladding of a glass of a lower refractive index than the core.

* * * * *